(12) United States Patent
Suh et al.

(10) Patent No.: US 7,691,773 B2
(45) Date of Patent: Apr. 6, 2010

(54) SUPPORTED CATALYST AND METHOD FOR PREPARING THE SAME

(75) Inventors: Sang-Hyuk Suh, Seoul (KR); Chan-Ho Pak, Seoul (KR); Hae-Kyoung Kim, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/747,009

(22) Filed: May 10, 2007

(65) Prior Publication Data

US 2008/0026936 A1 Jan. 31, 2008

Related U.S. Application Data

(62) Division of application No. 11/075,866, filed on Mar. 10, 2005, now Pat. No. 7,229,942.

(30) Foreign Application Priority Data

Mar. 23, 2004 (KR) .................. 10-2004-0019625

(51) Int. Cl.
- H01M 4/88 (2006.01)
- B01J 31/00 (2006.01)
- B01J 37/00 (2006.01)
- C08F 4/02 (2006.01)
- C08F 4/60 (2006.01)

(52) U.S. Cl. .................. 502/159; 502/101; 502/150

(58) Field of Classification Search .................. 502/101, 502/150, 159
See application file for complete search history.

(56) References Cited

U.S. PATENT DOCUMENTS

| | | | |
|---|---|---|---|
| 3,493,343 A | 2/1970 | Braid et al. | |
| 4,235,748 A * | 11/1980 | Berchielli et al. | ........... 502/151 |
| 4,719,145 A * | 1/1988 | Neely | ................ 428/327 |
| 4,725,568 A | 2/1988 | Parker et al. | |
| 4,843,105 A | 6/1989 | Reischl et al. | |
| 4,857,493 A | 8/1989 | Ford et al. | |
| 4,888,209 A * | 12/1989 | Neely | ................ 428/433 |

(Continued)

FOREIGN PATENT DOCUMENTS

JP 05-293383 11/1993

(Continued)

Primary Examiner—Patricia L Hailey
(74) Attorney, Agent, or Firm—H.C. Park & Associates, PLC

(57) ABSTRACT

The invention provides and a highly-dispersed supported catalyst that has a reduced average particle size of catalytic metal particles and is also supported by a porous support material. A method of preparing a supported catalyst that can reduce the average particle size of catalytic metal particles supported by a support material includes first mixing a charged support material with a solution containing a polymer electrolyte having a charge opposite to that of the support material to adsorb the polymer electrolyte on the support material. Next, the support material having the polymer electrolyte adsorbed thereon is mixed with a solution containing a catalytic metal precursor ion having a charge opposite to that of the polymer electrolyte to adsorb the catalytic metal precursor ion on the support material having the polymer electrolyte adsorbed on it. Finally, the catalytic metal precursor ion adsorbed on the support material having the polymer electrolyte adsorbed thereon is reduced to a catalytic metal in a reducing solution.

10 Claims, 2 Drawing Sheets

U.S. PATENT DOCUMENTS

| | | | |
|---|---|---|---|
| 5,068,161 A | | 11/1991 | Keck et al. |
| 5,084,144 A | * | 1/1992 | Reddy et al. ................. 205/104 |
| 5,316,871 A | * | 5/1994 | Swathirajan et al. .......... 429/33 |
| 5,501,915 A | | 3/1996 | Hards et al. |
| 5,567,355 A | | 10/1996 | Wessling et al. |
| 5,677,074 A | * | 10/1997 | Serpico et al. ................. 429/43 |
| 5,728,485 A | * | 3/1998 | Watanabe et al. ............. 429/41 |
| 6,232,494 B1 | | 5/2001 | Morgenstern et al. |
| 6,492,295 B2 | * | 12/2002 | Hitomi et al. ................. 502/159 |
| 6,524,736 B1 | * | 2/2003 | Sompalli et al. .............. 429/42 |
| 6,528,201 B1 | * | 3/2003 | Hitomi ......................... 429/42 |
| 6,828,270 B1 | * | 12/2004 | Zhang et al. ................. 502/159 |
| 6,833,487 B2 | | 12/2004 | Pesce et al. |
| 6,967,183 B2 | | 11/2005 | Hampden-Smith et al. |
| 7,229,942 B2 | * | 6/2007 | Suh et al. .................... 502/159 |
| 2002/0160271 A1 | | 10/2002 | Frech et al. |
| 2004/0191602 A1 | | 9/2004 | Ishikawa et al. |

FOREIGN PATENT DOCUMENTS

| | | |
|---|---|---|
| JP | 2001-525247 | 12/2001 |
| JP | 2003-286376 | 10/2003 |
| JP | 2005-066592 | 3/2005 |
| WO | 9961141 A1 | 12/1999 |

* cited by examiner

SUPPORTED CATALYST AND METHOD FOR PREPARING THE SAME

CROSS-REFERENCE TO RELATED APPLICATION

This application is a divisional of prior application Ser. No. 11/075,866, filed Mar. 10, 2005, which claims priority to and the benefit of Korean Patent Application No. 10-2004-0019625, filed on Mar. 23, 2004 which are all hereby incorporated by reference for all purposes as if fully set forth herein.

BACKGROUND OF THE INVENTION

1. Field of the Invention

The present invention relates to a catalyst and a method of preparing the same. More particularly, the present invention describes a supported catalyst and a method of preparing the same.

2. Description of the Related Art

Supported catalysts are widely used to accelerate the chemical reaction rate in various applications. It is well known that a supported catalyst consists of a catalyst component and a porous support material component. The catalyst component is attached to a surface of the porous support material component. In general, since many pores are present in a porous support is material, the porous support material has a very large surface area. Such a large surface area provides many positions in which many catalyst particles can be dispersed.

For example, a carbon-supported metal catalyst uses a porous carbon particle as a support material and a catalytic metal particle as a catalyst. Such a carbon-supported metal catalyst is used in an electrode of a fuel cell. More specifically, a carbon-supported metal catalyst is used in a cathode and/or an anode in a phosphoric acid fuel cell (PAFC), a proton exchange membrane fuel cell (PEMFC), or a direct methanol fuel cell (DMFC).

The catalyst accelerates the rate of electrochemical oxidation of a fuel and/or the rate of electrochemical reduction of oxygen. The carbon particle of the carbon-supported metal catalyst has a dual role as a support material and as an electronic conductor. Platinum and platinum/ruthenium alloy, for example, are frequently used as a catalytic metal particle.

Typically, a supported catalyst is prepared by adding a catalytic metal precursor solution to a dispersion of support material so that the catalytic metal precursor adsorbs onto the support material. Then a solution of a reducing agent is added to the dispersion to reduce the catalytic metal precursor adsorbed on a surface of the support material to a catalytic metal particle (see, U.S. Pat. No. 5,068,161). Finally, a freeze-drying is performed to obtain supported catalyst powders.

It is well known that one of main factors that affect the catalytic activity of a supported catalyst is the total surface area of supported catalytic metal particles. The surface area of the catalytic metal particles is, in turn, affected by the average particle size of catalytic metal particles and the amount of the catalytic metal particles present on the support. If the amount of the catalytic metal particles on the support is constant, the average particle size of the catalytic metal particles is inversely proportional to the total surface area of the supported catalytic metal particles. If an average particle size of the catalytic metal particles is constant, the amount of the catalytic metal particles on the support is directly proportional to the total surface area of the supported catalytic metal particles.

Thus, one of the important technical objects in the supported catalyst field is to produce smaller supported catalytic metal particles than a conventional supported catalyst.

In a fuel cell such as a PAFC, PEMFC, or DMFC, as the activity of a carbon-supported metal catalyst contained in the electrode increases, the power density of electricity generation in the fuel cell increases while maintaining energy efficiency. Accordingly, the ratio of power generation to production costs of the fuel cell stack increases and the ratio of power generation to the weight or volume of the fuel cell stack increases.

For a supported catalyst prepared using the conventional method, as the amount of the catalytic metal particles on a support increases, the average particle size of the catalytic metal particles tends to increase as well. Due to this phenomenon, there is a limit on the improvement of the catalytic activity of a supported catalyst.

Further, although the size of the catalytic metal particles on the support can be reduced by preparing them according to the conventional method, the decrease of the average particle size of the catalytic metal particles also has a limit.

Thus, there is a need to develop a technique that can reduce the average particle size of catalytic metal particles to be placed on a support material while increasing or maintaining the conventional amount of catalytic metal particles supported.

SUMMARY OF THE INVENTION

The present invention provides a method for preparing a supported catalyst that can reduce the average particle size of supported catalytic metal particles.

The present invention also provides a supported catalyst that has a reduced average particle size of catalytic metal particles supported on a porous support material.

An embodiment of the present invention provides a method of preparing a supported catalyst, where a charged support material is mixed with a solution containing a polymer electrolyte having a charge opposite to that of the support material, thereby adsorbing the polymer electrolyte on the support material. Next, the polymer electrolyte adsorbed on the support is mixed with a solution containing a catalytic metal precursor. The charge of the catalytic metal precursor ion is opposite to that of the polymer electrolyte the catalytic metal precursor ion on the support material having the polymer electrolyte adsorbed thereon. Finally, the catalytic metal precursor ion adsorbed on the support material having the polymer electrolyte adsorbed thereon is reduced to a catalytic metal in a reducing solution.

In the present embodiment, prior to adsorbing the catalytic metal precursor on the support material having the same charge as that of the catalytic metal precursor, the polymer electrolyte with a charge opposite to that of the catalytic metal precursor and the support material is adsorbed on the support material. That is, the catalytic metal precursor is not adsorbed directly on the support material, but on a layer of the polymer electrolyte adsorbed on a surface of the support material.

Since the polymer electrolyte has an opposite electrical charge from that of the catalytic metal precursor ion, an electrical attraction occurs between the polymer electrolyte and the catalytic metal precursor ion. Thus, the catalytic metal precursor ions are dispersed uniformly and densely on the surface of the support material having the polymer electrolyte adsorbed thereon. Surprisingly, the average particle size of catalytic metal particles reduced from such catalytic metal precursor ion is even smaller than that of supported catalytic metal particles in conventional supported catalysts.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Figure 1:
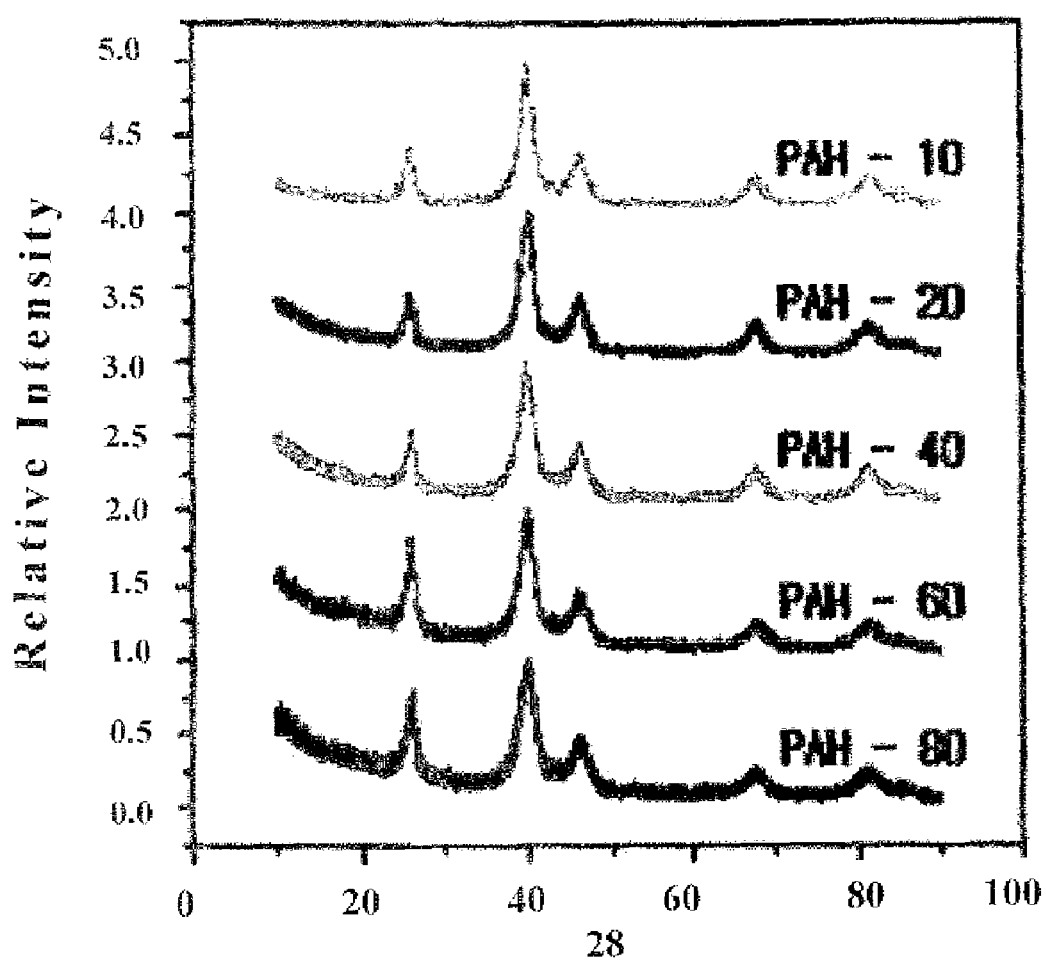
FIG. 1 is a view illustrating the results of an X-ray diffraction (XRD) analysis for a supported catalyst prepared according to example of the present invention.

Hereinafter, the method according to an embodiment of the present invention will be described in more detail.

An exemplary embodiment of the present invention provides a method for preparing a supported catalyst in which a negatively charged support material is first mixed with a positively charged polymer ion-containing solution to adsorb the polymer ion on the support material. Next, the support material with the polymer ion adsorbed on it is mixed with a negatively charged catalytic metal precursor ion-containing solution so that the catalytic metal precursor ion can be absorbed on the support material having the polymer ion adsorbed on it. Finally, the catalytic metal precursor ion that is adsorbed on the support material having the polymer ion adsorbed thereon is reduced to a catalytic metal in a reducing solution.

Examples of the negatively-charged support material used in the present embodiment include a carbon-based porous support material, $SiO_2$-based porous support material, $TiO_2$-based porous support material, and $V_2O_5$-based porous support material.

Examples of the carbon-based porous support material may include, but are not limited to, carbon black, carbon molecular sieve, carbon nanotube, and mixtures thereof. Examples of commercially available carbon-based porous support material include vulcan XC-72, Ketjen black, Denka Black, and acetylene black.

In the present embodiment, the support material can be used in powder or suspension form. The suspension contains a support material and a dispersion medium. Examples of the dispersion medium include water, isopropyl alcohol, ethanol, methanol, and mixtures thereof.

The term "polymer electrolyte" refers to a polymer having a dissociation group in its backbone or branch. When the dissociation group of the polymer electrolyte is dissociated, the polymer electrolyte is decomposed into a low weight ion and a high weight ion. The high weight ion inherits the chain structure of the polymer electrolyte and is referred to as "a high molecular weight ion."

The positively-charged polymer ion can be derived from a cationic polymer. Examples of the cationic polymer include, but are not limited to, a polymer having a nitrogen atom in its backbone or branch. The nitrogen atom can form an amine structure

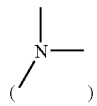

or or an ammonium structure

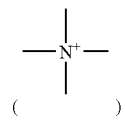

The amine structure can be converted to an ammonium structure under appropriate conditions.

Other examples of the cationic polymer include poly L-lysin (PLL), pAMEAMA is dendrimer, poly(L-glutamic acid) (PLGA), poly(1-methyl-2-vinylpyridine) (PVP), poly L-ornithine, polyspermine, and diethylaminoethyl dextran (DEAE dextran).

Examples of the cationic polymer electrolyte having a nitrogen atom in its backbone or branch include polyallylamine hydrochloride (PAH), polyethylenimine (PEI), polydiallyldimethylammonium chloride, polymethacryloxyethyltrialkylammonium halide, aminoethylated polyacrylamide, Hofman-degradated polyacrylamide, polyethyleneamine, cationized starch, chitosan, and mixtures thereof.

The cationic polymer electrolyte having a nitrogen atom in its backbone or branch may have a repeating unit, as follows:

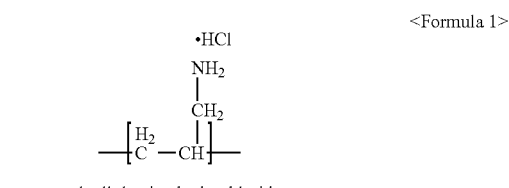

polyallylamine hydrochloride <Formula 1>

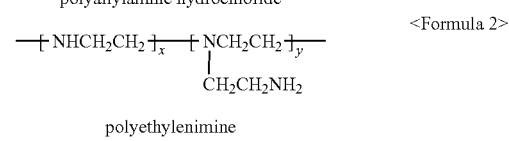

polyethylenimine <Formula 2>

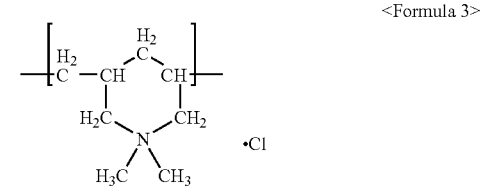

polydiallyldimethylammonium chloride <Formula 3>

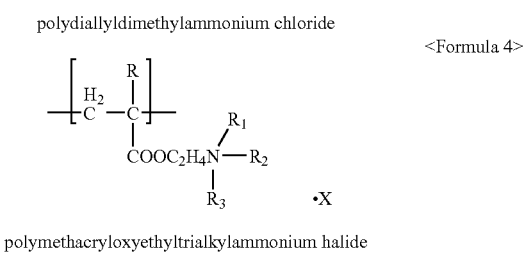

polymethacryloxyethyltrialkylammonium halide <Formula 4>

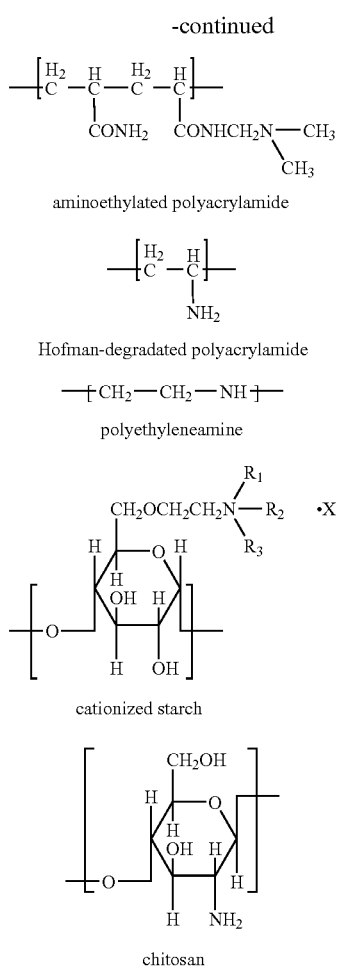

<Formula 5> aminoethylated polyacrylamide

<Formula 6> Hofman-degradated polyacrylamide

<Formula 7> polyethyleneamine

<Formula 8> cationized starch

<Formula 9> chitosan wherein X is a halogen atom.

The cationic polymer electrolyte with a nitrogen atom in its backbone or branch may be a copolymer with at least two repeating units described above.

If the average molecular weight of the polymer ion or the polymer electrolyte is too low, it cannot sufficiently surround the carbon support material. Thus, platinum complex ions are locally arranged around the carbon support material which results an increase in the metal particle size. If the average molecular weight of the polymer ion or the polymer electrolyte is too high, it envelopes the carbon support material. Thus, a reaction surface area may be significantly reduced even when the platinum is supported by the carbon support material.

Therefore, the polymer ion or the polymer electrolyte preferably has an average molecular weight in a range of about 50 to 15,000. The specific molecular weight range varies depending on the polymer ion or the polymer electrolyte. For example, PAH may preferably have an average molecular weight in the range of about 5,000 to about 15,000, and more preferably in the range from about 8,000 to about 11,000. PEI may preferably have an average molecular weight of about 50 to about 15,000, and more preferably from about 50 to about 5,000.

Examples of a solvent that can dissolve the polymer electrolyte may include but are not limited to water, n-hexane, ethanol, triethylamine, tetrahydrofuran (THF), dimethyl sulfoxide (DMSO), ethyl acetate, isopropyl alcohol, acetone, acetonitrile, benzene, butyl alcohol, chloroform, diethyl ether, and mixtures thereof.

In the present embodiment, a negatively-charged support material is mixed with a positively-charged polymer ion-containing solution to adsorb the polymer ion onto the support material. The polymer ion-containing solution may be obtained by dissolving a polymer electrolyte in a solvent. The support material added to the polymer ion-containing solution may be in a form of a powder or a suspension.

The support material may be mixed with the polymer ion-containing solution using a conventional stirrer, such as a homogenizer and a magnetic stirrer. Through the mixing, the polymer ion becomes adsorbed on the surface of the support material.

The amount of each component in the mixture of the support material and the polymer ion-containing solution is not specifically limited. However, if the amount of the support material in the mixture is insufficient, the yield is low and it is difficult to remove the polymer electrolyte. If the amount of the support material in the mixture is too high, the polymer electrolytes can cover all the support material. Considering this, the amount of the support material in the mixture may be in the range of 0.4% to about 0.5% by weight of total solvents in the mixture.

If the amount of the polymer ion in the mixture is too low, there may be insufficient dispersion. If the amount of the polymer ion in the mixture is too high, the reaction area of the supported catalyst can be reduced. Considering this, the amount of the polymer electrolyte added to the mixture may range from about 5% to about 90% by weight of total solvents in the mixture.

The stirring time of the mixture of the support material with the polymer ion-containing solution is not specifically limited. However, if the stirring time is too short, the polymer ion may be locally arranged around the support material. If the stirring time is too long, a production process is too time-consuming. The stirring time can vary depending on process conditions, such as performance of a stirrer and amounts of materials to be added. Generally, the stirring time may be from about 1 hour to about 2 hours.

After the polymer ion is adsorbed on the surface of the support material in this way, it is mixed with a negatively charged catalytic metal precursor ion-containing solution. This allows the support material having the polymer ion adsorbed thereon to absorb the catalytic metal ion on it. The support material with the polymer ion adsorbed on it may be mixed with the catalytic metal precursor ion-containing solution by being stirred as in the previous operation, using a conventional stirrer, such as a homogenizer. Alternatively, it can be obtained as a product separated by filtering the mixture. Through the mixing, the catalytic metal precursor ion in the mixture becomes adsorbed on the surface of the support material having the polymer ion adsorbed thereon.

The negatively charged catalytic metal precursor ion may be an atomic group containing a metal atom, such as Pt, Ru, Au, Pd, Rh, Ir, Os, or the like, or mixtures of the atomic group. The ion may also be derived from an ionic compound-based catalytic metal precursor. Examples of an ionic compound that can derive a negatively charged catalytic metal precursor ion for producing a Pt catalyst include, but are not limited to tetrachloroplatinic acid(II) ($H_2PtCl_4$), hexachloroplatinic acid(IV) ($H_2PtCl_6$), potassium tetrachloroplatinate(II) ($K_2PtCl_4$), potassium hexachloroplatinate(IV) ($K_2PtCl_6$), or mixtures thereof.

Examples of an ionic compound that can derive a negatively charged catalytic metal precursor ion for producing a Ru catalyst include $(NH_4)_2[RuCl_6]$ and $(NH_4)_2[RuCl_5H_2O]$.

Examples of an ionic compound that can derive a negatively charged catalytic metal precursor ion for producing an Au catalyst include $H_2[AuCl_4]$, $(NH_4)_2[AuCl_4]$, and $H[AU(NO_3)4]H_2O$.

For an alloy catalyst, a mixture of the catalytic metal precursors having a mixing ratio corresponding to a ratio of metal atoms as desired can be used.

Examples of a solvent in which the ionic compound is dissolved include water, alcohol, acetone, and mixtures thereof. Examples of alcohol include, but are not limited to methanol, ethanol, and propanol.

The amount of each component in the mixture of support material having the polymer ion adsorbed thereon with the negatively charged catalytic metal precursor ion is not specifically limited. However, if the amount of the support material having the polymer ion adsorbed thereon is too low, the yield of the final product may be low. If the amount of the support material having the polymer ion adsorbed thereon added to the mixture is too high, it becomes difficult to disperse the support material. Considering these factors, the amount of the support material having the polymer ion adsorbed thereon added to the mixture may be typically range from about 0.2% to about 0.3% by weight based on the weight of total solvents in the mixture. Generally, the catalytic metal precursor is added to the mixture in such an amount that the weight ratio of Pt to the carbon support material is about 3:7.

While the mixture of the support material having the polymer ion adsorbed thereon with the negatively charged catalytic metal precursor ion-containing solution is being stirred, the stirring time is not specifically limited. The stirring time can vary depending on process conditions, such as performance of a stirrer and amount of materials to be added. However, if the stirring time is too short, the catalytic metal precursor ion may be locally arranged around the polymer ion. While, there is no upper limit to the stirring time, generally, the stirring time ranges from about 1 hour to about 2 hours.

After the negatively charged catalytic metal precursor ion is adsorbed onto the surface of the support material having the polymer ion adsorbed thereon in this way, the adsorbed catalytic metal precursor ion is reduced to a catalytic metal in a reducing solution. The term "reducing solution" refers to a liquid reducing agent that oxidizes itself to reduce a catalytic metal precursor ion to a catalytic metal, or a solution containing a reducing agent which oxidizes itself to reduce a catalytic metal precursor ion to a catalytic metal.

Examples of the reducing agent may include but are not limited to hydrazine, formaldehyde, formic acid, and polyol. Examples of polyol may include but are not limited to ethylene glycol, glycerol, diethylene glycol, and triethylene glycol.

The catalytic metal precursor ion adsorbed on the support material may be reduced by mixing it with the reducing solution, by stirring it as in the previous operation, or as a product obtained by filtering the mixture.

The amount of each component in the mixture for the reduction reaction is not specifically limited. However, if the amount of the support material having the catalytic metal precursor ion adsorbed thereon added to the mixture is insufficient, the yield may be low. If the amount of the support material having the catalytic metal precursor ion adsorbed thereon added to the mixture is too high, it is difficult to disperse the support material. Considering these factors, the amount of support material having the catalytic metal precursor ion adsorbed thereon added to the mixture may generally range from about 0.2% to about 0.3% by weight based on the weight of total solvents (including the reducing solution) in the mixture.

In order to accelerate the reduction of the catalytic metal precursor ion, it is preferable to heat the mixture. If a heating temperature of the reactant mixture is too low, the effect of accelerating the reduction reaction may be very slight. If a heating temperature of the reactant mixture is too high, the reduction reaction rate becomes too rapid, and thus, it is impossible to attain a uniform reduction. Considering this, the heating temperature of the mixtures for the reduction reaction may be typically range from room temperature (i.e., about 20.degree. C.) to about 380.degree. C. More preferably, the mixtures for the reduction reaction may be heated in such a range that a solvent in the mixture for the reduction reaction (including the reducing solution) may boil.

In addition, the reduction time is not specifically limited and it may vary depending on process conditions such as the temperature of the reactant mixture. However, if the reduction time is too short, the fraction of unreduced support material may be increased. There are no upper limits to the reduction time but generally, the reduction time may range from about 1 hour to about 2 hours.

By reducing the catalytic metal precursor ion adsorbed on the surface of the support material in this way, the resulting catalytic metal particles with an average particle size of from about 1.8 to about 4.5 nm are uniformly formed on the surface of the support material.

Another exemplary embodiment of the present invention, provides a method for preparing a supported catalyst where a positively charged support material is first mixed with a negatively charged polymer ion-containing solution to adsorb the polymer ion on the support material. Next, the support material with the polymer ion adsorbed on it is mixed with a positively charged catalytic metal precursor ion-containing solution to adsorb the catalytic metal precursor ion on the support material having the polymer ion adsorbed on it. Finally, the catalytic metal precursor ion adsorbed on the support material having the polymer ion also adsorbed thereon is reduced to a catalytic metal in a reducing solution.

The surface of the support material may be positively charged by adjusting the pH of the dispersion in which the support material is dispersed. Examples of an anionic polymer ion used in the present embodiment include, but are not limited to, poly(sulfopropyl methacrylate), poly(styrene sulfonate), polyacrylate and metal salts thereof.

According to another embodiment of the present invention, there is a highly-dispersed supported catalyst. The term "highly-dispersed" means that the average particle size of the catalytic metal particles supported by the porous support material is much smaller than that of a conventional supported catalyst. The highly-dispersed supported catalyst according to the present embodiment comprises a porous support material, a polymer electrolyte adsorbed on a surface of the porous support material, and a catalytic metal particle supported by the surface of the porous support material. The supported catalyst can be made using the method according to the previous embodiment of the present invention.

In the supported catalyst according to the present embodiment, the support material, the polymer electrolyte, and the catalytic metal are the same as those as described above. The amount of the polymer electrolyte may range from about 4% to about 11% by weight based on the total weight of the porous support material. The amount of the catalytic metal may be between about 8% to about 30% by weight based on the total weight of the porous support material. The average particle size of the catalytic metal particles may be between about 1.8 to about 4.5 nm.

The supported catalyst according to the present embodiment supports a catalytic metal particle having a reduced average particle size, and thus, the catalytic activity can be improved.

The supported catalyst according to the present embodiment can be used in the catalyst layer of an electrode for a fuel cell. In addition, the supported catalyst according to the present embodiment can be used as a catalyst for various chemical reactions, for example, hydration, dehydration, coupling, oxidation, isomerization, decarboxylation, hydrocracking, and alkylation, etc.

EXAMPLES

Examples 1 through 5

Polyallylamine Hydrochloride (PAH)

0.5 g of graphite powders (XC72R-2800) were dispersed in 200 g of distilled water. PAH was dissolved in the graphite powder dispersion to produce a first dispersion. The amounts of PAH added in Examples 1 through 5 were 10, 20, 40, 60, 80% by weight, based on the weight of the graphite powders, respectively.

0.550 g of $H_2PtCl_6$ was dissolved in 50 g of distilled water to produce a second solution. Then, the second solution was added to the first dispersion and was stirred for one hour.

0.504 g of $NaBH_4$ was dissolved in 13.32 g of distilled water to produce a reducing solution.

The reducing solution was then slowly added to the mixture of the first dispersion with the second solution, while being stirred for one hour to obtain a Pt/C supported catalyst.

The obtained Pt/C supported catalyst was filtered, washed, and then dried.

Examples 6 through 10

Polyethylenimine (PEI)

Pt/C supported catalysts were produced in the same manner as in Examples 1 to 5, except that PEI was used instead of PAH and that the amounts of PEI added in Examples 6 through 10 were 10, 20, 40, 60, 80% by weight based on the weight of the graphite powders, respectively.

Comparative Example

No Polymer Electrolyte Used 0.5 g of graphite powders (XC72R-2800) were dispersed in 200 g of distilled water to produce a first dispersion. 0.550 g of $H_2PtCl_6$ was dissolved in 50 g of distilled water to produce a second solution. Then, the second solution was added to the first dispersion and stirred for one hour. 0.504 g of $NaBH_4$ was dissolved in 13.32 g of distilled water to produce a reducing solution. The reducing solution was slowly added to the mixture of the first dispersion with the second solution, while being stirred for one hour to obtain a Pt/C supported catalyst. The obtained Pt/C supported catalyst was filtered, washed, and then dried.

Evaluation Results

The amounts of polymer electrolyte in the supported catalysts produced in Examples 1 through 10 and Comparative Example were measured using a thermogravimetric analyzer (TGA) and a differential scanning calorimeter (DSC). The results are shown in Table 1.

Figure 2:
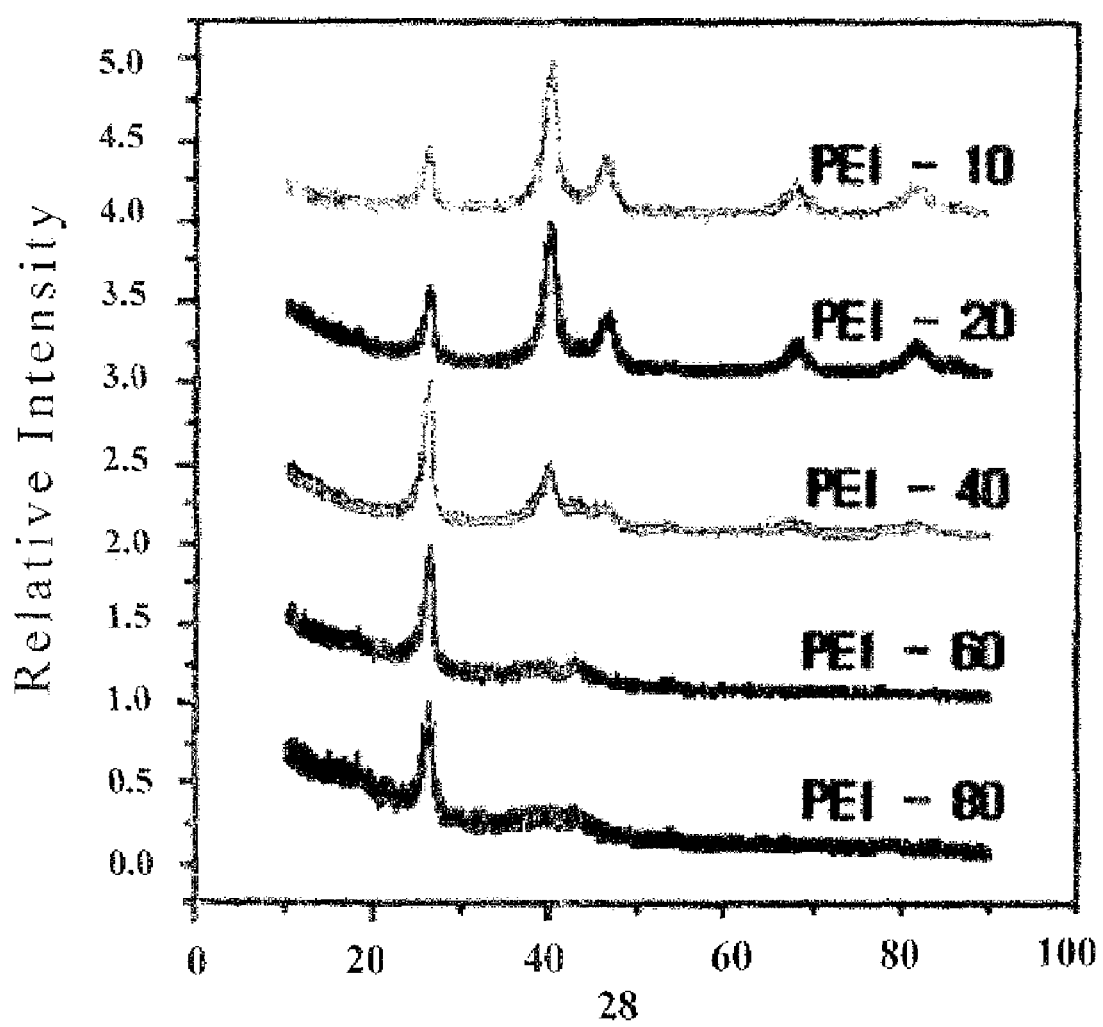
FIG. 2 is a view illustrating the results of an XRD analysis for a supported catalyst prepared according to another example of the present invention.

In addition, X-ray diffraction (XRD) analysis was performed for each of the supported catalysts produced in Examples 1 through 10 and Comparative Example. The results are shown in FIG. 1 (Examples 1 through 5) and FIG. 2 (Examples 6 through 10).

An average particle size of the supported Pt particles was determined using the XRD analysis results for the supported catalysts produced in Examples 1 through 10 and Comparative Example. The results are shown in Table 1.

TABLE 1

| Sample name | Polymer electrolyte used | Amount of the polymer electrolyte in the supported catalyst (mg/g-supported material) | Average particle size of the supported Pt (nm) |
| --- | --- | --- | --- |
| Example 1 | PAH, 10% by weight | 4 | 4.5 |
| Example 2 | PAH, 20% by weight | 5 | 4.5 |
| Example 3 | PAH, 40% by weight | 7 | 3.9 |
| Example 4 | PAH, 60% by weight | 6 | 3.9 |
| Example 5 | PAH, 80% by weight | 8 | 3.7 |
| Example 6 | PEI, 10% by weight | 4 | 4.7 |
| Example 7 | PEI, 20% by weight | 5 | 4.5 |
| Example 8 | PEI, 40% by weight | 7 | 2.9 |
| Example 9 | PEI, 60% by weight | 11 | 1.8 (result of TEM) |
| Example 10 | PEI, 80% by weight | 11 | 1.8 (result of TEM) |
| Comparative Example | No | No | 6.7 |

Table 1 confirms that the average Pt particle size of each supported catalyst produced in Examples 1 through 10 is much smaller than that of the supported catalyst produced in Comparative Example without using a polymer electrolyte. Further, Table 1 confirms that the amount of the polymer electrolyte used is inversely proportional to the average Pt particle size.

The method according to an embodiment of the present invention provides a highly-dispersed supported catalyst containing a catalytic metal particle with a reduced average particle size. The highly-dispersed supported catalyst according to an embodiment of the present invention has an improved catalytic activity for the amount of catalytic metal supported.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A supported catalyst, comprising:
   a porous support material;
   a polymer electrolyte absorbed onto a surface of the porous support material; and
   a catalytic metal particle supported by the surface of the porous support material,
   wherein the catalytic metal particle is not absorbed directly onto the support material and is absorbed onto the polymer electrolyte, and
   wherein the amount of the polymer electrolyte is 4% to 11% by weight based on the weight of the porous support material.

2. The supported catalyst of claim 1, wherein the average particle size of the catalytic metal particles ranges from 1.8 to 4.5 nm.

3. A method of preparing a supported catalyst, comprising:

mixing a positively charged support material with a negatively charged polymer ion-containing solution to absorb the polymer ion on the support material;

mixing the support material having the polymer ion absorbed thereon with a positively charged catalytic metal precursor ion-containing solution to absorb the catalytic metal precursor ion on the polymer ion absorbed on the support material, the catalytic metal particle not being absorbed directly onto the support material; and reducing the catalytic metal precursor ion absorbed on the support material having the polymer ion absorbed thereon to a catalytic metal in a reducing solution, wherein the negatively charged polymer ion is derived from a compound selected from the group consisting of poly(sulfopropyl methacrylate), poly(styrene sulfonate), polyacrylate and metal salts thereof.

4. The method of claim 3, wherein the positively charged support material is a carbon-based porous support material, $SiO_2$-based porous support material, $TiO_2$-based porous support material, or $V_2O_5$-based porous support material.

5. The method of claim 4, wherein the carbon-based porous support material is carbon black, carbon molecular sieve, or carbon nanotube.

6. The method of claim 3, wherein the catalytic metal precursor ion is an atomic group comprising Pt, Ru, Au, Pd, Rh, Ir, or Os, or mixtures of the atomic group.

7. The method of claim 5, wherein the reducing solution may be selected from the group consisting of hydrazine, formaldehyde, formic acid, and polyol.

8. The method of claim 3, wherein the reduction of the catalytic metal precursor ion is performed at a temperature ranging from room temperature to 380° C.

9. A supported catalyst, comprising:

a porous support material;

a polymer electrolyte absorbed onto a surface of the porous support material; and a catalytic metal particle supported by the surface of the porous support material, wherein the catalytic metal particle is not absorbed directly onto the support material and is absorbed onto the polymer electrolyte, and wherein the amount of the catalytic metal is 8% to 30% by weight based on the weight of the porous support material.

10. The supported catalyst of claim 9, wherein the average particle size of the catalytic metal particles ranges from 1.8 to 4.5 nm.

* * * * *